No. 854,145. PATENTED MAY 21, 1907.
P. BROADBOOKS.
PIPE AND ROD GRIPPING ATTACHMENT FOR VISES.
APPLICATION FILED MAR. 9, 1907.

WITNESSES

INVENTOR:
Peter Broadbooks
BY
Attorneys

UNITED STATES PATENT OFFICE.

PETER BROADBOOKS, OF BATAVIA, NEW YORK.

PIPE AND ROD GRIPPING ATTACHMENT FOR VISES.

No. 854,145.  Specification of Letters Patent.  Patented May 21, 1907.

Application filed March 9, 1907. Serial No. 361,488.

*To all whom it may concern:*

Be it known that I, PETER BROADBOOKS, of Batavia, in the county of Genesee and State of New York, have invented certain new and useful Improvements in Pipe and Rod Gripping Attachments for Vises; and I hereby declare that the following is a full, clear, and exact description thereof, reference being had to the accompanying drawings, which form part of this specification.

This invention is an improved pipe-gripping attachment for vises, and its objects are to provide a simple effective pipe and rod gripping device which can be readily attached to or detached from vises. To construct the gripping sections of such members so that they can be stamped, if desired, out of plate metal; to provide a plurality of such sections on each opposed member of the die-stock, so that the attachment will not kink or bend the pipe gripped thereby; and in case any section is injured it can be replaced without necessitating throwing away the entire member of the attachment; to give the sections a bearing against the inner faces of the vise jaws, and to reduce the size of the sockets in the jaws whereby the attachments are secure thereto,—thus preventing any serious weakening of the jaws, and allowing larger sizes of pipe-gripping attachments to be applied thereto as desired.

I will now describe the invention with reference to the accompanying drawings which illustrate the attachment applied to one of my vises, but I do not herein claim any particular form of vise, and the attachment is applicable to various makes and kinds of vises.

Figure 1:
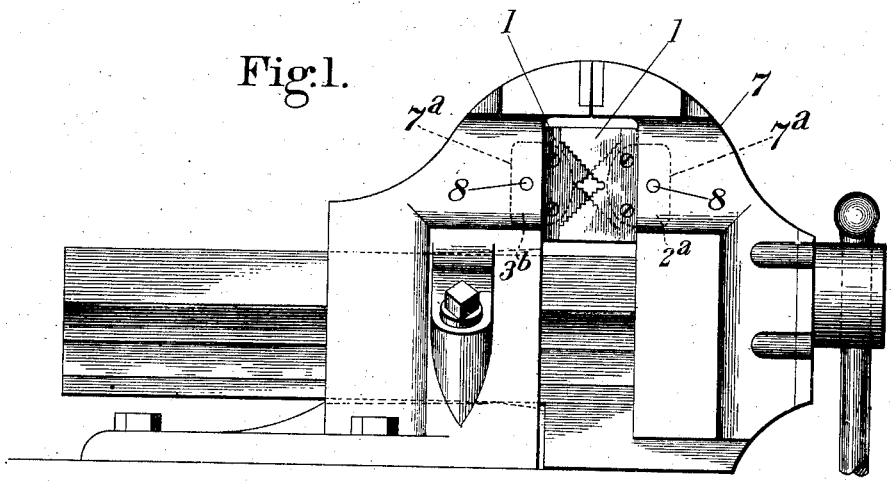
Figure 2:
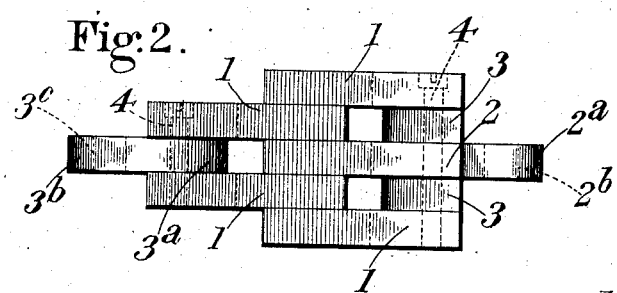
Figure 3:
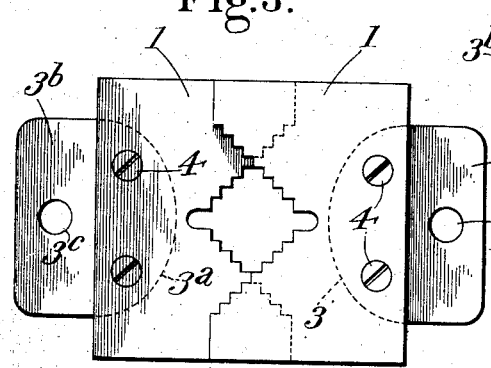
Figure 4:
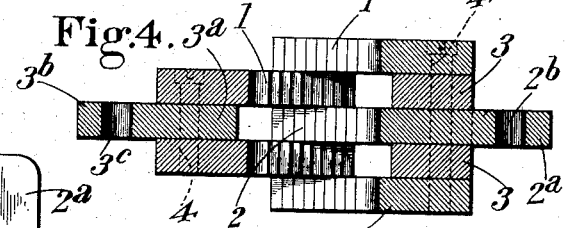
Figure 5:
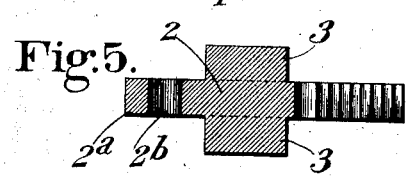

In said drawings—Figure 1 is a side elevation of a vise showing my improved pipe-gripping attachment applied thereto. Fig. 2 is an edge view of the attachment removed from the vise. Fig. 3 is a plan view of Fig. 2. Fig. 4 is a longitudinal section through the attachment. Fig. 5 is a detail section illustrating a slight modification.

The pipe and rod gripping attachment comprises two opposite members adapted to be attached to the opposite jaws of an ordinary vise. One member is shown as composed of three gripping sections 1, 1 and 2; section 2 being arranged intermediate the sections 1 and spaced apart therefrom by spacer-blocks 3, all said members and spacer-blocks are detachably connected together by pins, bolts or screws 4 as shown, so that if any section or block is injured it can be removed and a duplicate substituted therefor. Each gripping section 1 and 2 is provided with a serrated V-notch in its outer end, adapted to grasp a pipe or rod in the manner of ordinary pipe-clamps.

The section 2 is extended in rear of sections 1 and blocks 3 to form a shank $2^a$, adapted to be inserted in a socket $7^a$ in the inner side of one of the jaws 7 of an ordinary vise, and is detachably secured to the jaw by a pin or bolt 8 transfixing the jaw and shank as shown, the shank $2^a$ having an opening $2^b$ for the passage of bolt 8. The other member of the attachment is composed of two gripping sections 1, 1, spaced apart by a block $3^a$, which in this instance has a rearward extension or shank $3^b$ adapted to enter a socket $7^a$ in the other vise-jaw and be secured thereto by a bolt 8, the shank $3^b$ having an opening $3^c$ for the passage of bolt 8. Either member can be attached to either jaw, and when attached thereto, the plates 1 on one member lie opposite the spacer-blocks of the opposed member, and consequently are adapted to slide past each other, and thus the device can grip pipes or rods of different diameters.

It will be seen that the gripping sections have a direct bearing against the inner face of the jaw 7 which enables them to be applied powerfully against the work, while the socket $7^a$ is so small that it can be made in the jaw without any appreciable weakening thereof, and this is one of the advantages of my attachment.

It will be seen by reference to Figs. 2 and 4 that section 2 of one member comes opposite the block $3^a$ of the opposed member, and slides between the sections 1, 1, thereof; while the latter sections will pass on opposite sides of the section 2, and between it and its related sections 1. All the gripping sections 1 are substantial duplicates, and can be made by or from the same dies, or patterns. Preferably the spacing-blocks 3, 3, are formed separately from the gripping sections, but in some cases they might be formed integral with section 2 as indicated in Fig. 5, all the gripping sections 1 however are duplicates.

My pipe holding attachment obviates the necessity of making the jaws of the vise heavy and bulky as is the case with other pipe vises; the sockets $7^a$ in the vise jaws being small, do not weaken the vise jaws; whereas ordinary die plates that enter into the jaws of a vise and are pivoted thereto require large recesses or receptacles to receive the same, and consequently said jaws are weakened at that point.

The members of my attachment have their bearing against the surface of the inner faces of the vise jaws, they do not enter sockets therein; consequently I dispense with the drilling of pin holes through all of the sections and blocks and shorten the sections, thus saving expense both in stock and labor.

A most important feature of my attachment is that the gripper sections being thin, can be stamped out to exact size and form. It is obvious the duplex sets of gripper sections have not only a greater hold on the pipe but will also prevent the pipe from kinking, the sections 1 being duplicates, if any of them be removed the rest of the sections will still work.

Pipe gripping jaws with duplex pipe grippers in which any one of the number of sections can be removed in case of breakage without disabling the usefulness of the other members thereof I consider new and very useful.

By attaching the gripper sections to small shanks like $2^a$ and $3^a$, I lessen the stock and dispense with the necessity of drilling the large pin-holes through all the sections; and I also reduce the size of the recesses or mortises in the inner face sides of the vise jaws to which the holders of my pipe dies are attached, thereby strengthening said vise jaws, and at the same time reducing the weight of the attachment and lessening expense.

Having described my invention what I claim as new and desire to secure by Letters Patent is:—

1. In combination with a vise, removable pipe gripping members detachably attached to the vise jaws below the gripping edges of such jaws, and each member comprising a plurality of gripping sections detachably connected together but spaced apart, the sections attached to one member being arranged to pass the sections attached to the opposite member, thereby obtaining a stronger grip-hold and preventing kinking of the pipe when pressure is applied to the jaws.

2. In a pipe or rod gripping attachment for vises, the combination of opposite members each provided with a plurality of gripping sections separated by spacing blocks, and each member being provided with a reduced shank portion adapted to enter a socket in a vise jaw, and be secured therein, while the gripping sections bear against the inner face of the jaw to which the member is attached, substantially as described.

3. In combination, a vise having sockets in the inner faces of its jaws; with a pipe and rod gripping attachment comprising opposite members, each provided with a plurality of notched gripping sections, and interposed spacing blocks, the gripping sections of one member being opposite the spacing blocks of the other member, and each member provided with a reduced shank portion adapted to enter the socket in a vise jaw, while the gripping sections bear against the inner face of such jaw, substantially as described.

4. In combination with a vise having socketed jaws, with pipe-gripping members attached to said jaws; one member comprising a central gripping section having a shank extension to enter a socket in the vise jaw, and outer sections spaced from the central section by blocks; and the opposite member having a central spacing section having an extension adapted to engage a socket in the vise jaw, and gripping sections at opposite sides of the spacing section, substantially as described.

5. The combination with a vise having sockets in the inner faces of its jaws; with pipe-gripping members, one member having a central and side gripping section, and interposed spacing blocks, and means for detachably connecting the said sections and blocks together; said central section having a shank portion adapted to engage a socket in one of the vise jaws,—the other member having a pair of gripping sections and an intermediate spacing block, said spacing block having a shank adapted to enter the socket in the other jaw; and means for detachably fastening said sections and block together; and means for removably fastening the shanks in the jaw sockets, substantially as described.

In testimony that I claim the foregoing as my own, I affix my signature in presence of two witnesses.

PETER BROADBOOKS.

Witnesses:
 EARL B. PERRY,
 BERTHA A. SAILE.